United States Patent
Watkins et al.

(10) Patent No.: US 7,209,319 B1
(45) Date of Patent: Apr. 24, 2007

(54) DISK DRIVE HAVING A DISK DRIVE COMPONENT ADHERED TO THE DISK DRIVE HOUSING VIA AN ADHESIVE ASSEMBLY HAVING A LEVELING LAYER

(75) Inventors: Norman K. Watkins, Gilroy, CA (US); Wayne M. Yamada, San Jose, CA (US); Gary C. Griffin, Boulder Creek, CA (US); Claire-Nechol Sevier, Hayward, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 332 days.

(21) Appl. No.: 10/877,740

(22) Filed: Jun. 25, 2004

(51) Int. Cl.
*G11B 33/14* (2006.01)
(52) U.S. Cl. .................................. 360/97.02
(58) Field of Classification Search ...................... None
See application file for complete search history.

(56) References Cited

U.S. PATENT DOCUMENTS

| | | | |
|---|---|---|---|
| 5,417,743 A * | 5/1995 | Dauber | 96/13 |
| 5,997,614 A * | 12/1999 | Tuma et al. | 96/4 |
| 6,618,222 B1 | 9/2003 | Watkins et al. | |
| 6,683,746 B1 * | 1/2004 | Kuroki et al. | 360/97.02 |
| 2003/0218828 A1 * | 11/2003 | Hong et al. | 360/97.02 |
| 2003/0218829 A1 * | 11/2003 | Hong et al. | 360/97.02 |

* cited by examiner

*Primary Examiner*—David Davis
(74) *Attorney, Agent, or Firm*—Young Law Firm

(57) ABSTRACT

A disk drive includes a disk drive housing having a breather hole formed through the disk drive housing. A breather filter is configured for attachment to the disk drive housing and for limiting and filtering airflow into the disk drive housing. The breather filter includes a breather filter housing portion having a breather filter housing surface that defines a filter housing hole. The filter housing hole is configured to align with the breather hole formed in the disk drive housing. A filter portion is fitted within the filter housing portion. A leveling layer is provided that defines a first leveling layer surface and a second leveling layer surface. The leveling layer is formed of a material that is impermeable to air. A first adhesive layer is provided to adhere the breather filter housing surface to the first leveling layer surface. A second adhesive layer 40 is also provided to adhere the second leveling layer surface to the disk drive housing. The leveling layer and the first and second adhesive layers further define respective openings that are aligned with the filter housing hole and the breather hole to collectively form a delimited and sealed airflow inlet to the disk drive.

10 Claims, 3 Drawing Sheets

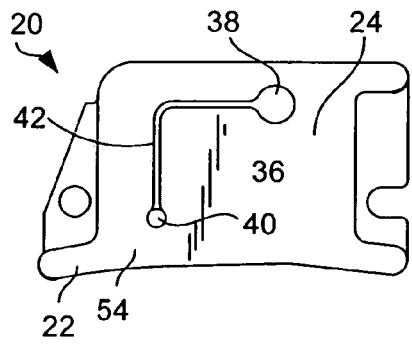
FIG. 2
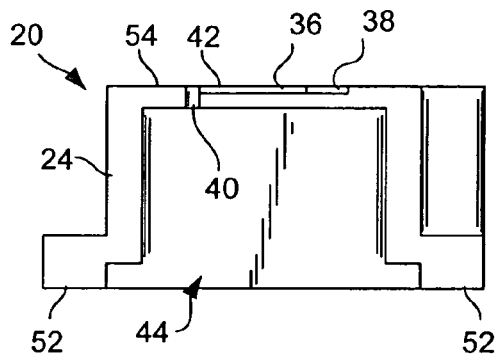
FIG. 3
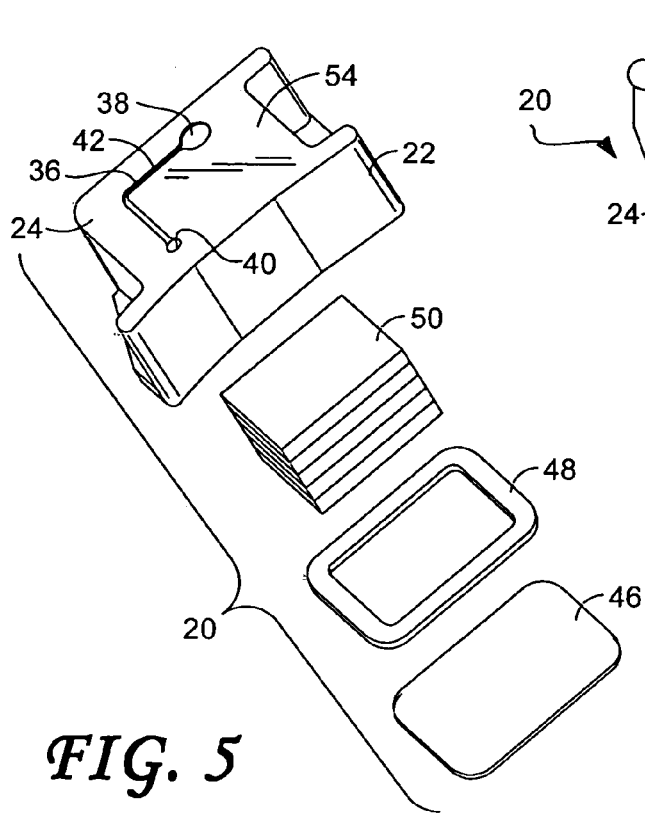
FIG. 4
FIG. 5

DISK DRIVE HAVING A DISK DRIVE COMPONENT ADHERED TO THE DISK DRIVE HOUSING VIA AN ADHESIVE ASSEMBLY HAVING A LEVELING LAYER

BACKGROUND OF THE INVENTION

1. Field of the Invention

The present invention relates to disk drives. More particularly, the present invention relates to the attachment of one or more disk drive components to the disk drive housing.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA) having an actuator assembly having at least one transducer head, typically several, for reading and writing data from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

Commonly assigned U.S. Pat. No. 6,618,222 (incorporated herein by reference in its entirety) discloses a breather filter that is effective to both reduce the effects of airflow generated within the disk drive due to rotation of the disks and to regulate and filter the airflow entering the drive. In particular, the breather filter disclosed therein includes a shroud that reduces turbulent airflow within the drive at and near the outer edge of the disk or disks, which turbulent airflow is believed to at least contribute to the cause of a number of problems. Such problems include, for example, an unwanted resonance response of and force on the actuator assembly, an increase in the percent off track values of the associated head, and disk flutter (vibrations induced on the disk or disks). The breather filter also filters airflow entering the disk drive for undesirable particulates and chemical compounds and regulates the humidity within the drive.

The breather filter described in the above-identified patent fits within the disk drive housing and may be attached to one of the surfaces of the disk drive housing (such as the disk drive cover, for example) by means of adhesive. In particular, the breather filter includes a surface that is configured for attachment to the disk drive cover. This surface of the breather filter is not (and cannot be made to be) perfectly flat. This surface, if examined microscopically, may be seen to have a certain roughness, which may be quantified as local differences in elevation (e.g., peaks and valleys) relative to a reference plane. In turn, the surface of the disk drive cover to which the breather filter is to be attached is not perfectly flat either. Indeed, this surface of the disk drive cover also has a certain roughness which, under sufficient magnification, may also be quantified as local differences in elevation relative to a reference plane.

When attaching the breather filter to the surface of the disk drive cover with adhesive, what is attempted is to adhesively mate two uneven surfaces. When the breather filter is attached to the surface of the disk drive cover, the breather filter is pressed again the disk drive cover, with a layer of adhesive between the two elements. Initially, therefore, the layer of adhesive between the disk drive cover and the breather filter and shroud is in compression. Afterwards, when the force applied to the elements is removed, the adhesive layer is in tension, causing a force on adhesive layer that tends to separate the breather filter from the disk drive housing cover. The roughness of the breather filter and that of the disk drive cover only exacerbate this tendency of the breather filter and shroud to separate from the disk drive cover because the adhesive cannot make good contact with the rough and uneven surfaces. Increasing the thickness of the adhesive layer does not solve this problem. This tendency to separate may reveal itself as an improper seal between the breather filter and the disk drive housing cover. In turn, such an improper seal reduces the effectiveness of the breather filter's ability to control humidity and filter particulates, with consequent undesirable effects upon the operation and reliability of the drive.

From the foregoing, it is apparent that improved means for adhering the breather filter to the disk drive cover are needed. Such improved means should provide for a good seal between the breather filter and the disk drive cover, and should compensate for the differences in evenness of the respective surfaces that are adhered to one another.

SUMMARY OF THE INVENTION

According to an embodiment thereof, the present invention is a disk drive that includes a disk drive housing having a breather hole formed through the disk drive housing and a breather filter configured for attachment to the disk drive housing and for limiting and filtering airflow into the disk drive housing. The breather filter may include a breather filter housing portion having a breather filter housing surface defining a filter housing hole configured to align (and/or in fluid communication) with the breather hole formed in the disk drive housing, a filter portion fitted within the filter housing portion, a leveling layer defining a first leveling layer surface and a second leveling layer surface, the leveling layer being formed of a material that is impermeable to air, a first adhesive layer and a second adhesive layer. The first adhesive layer may be configured to adhere the breather filter housing surface to the first leveling layer surface, and the second adhesive layer may be configured to adhere the second leveling layer surface to the disk drive housing. The leveling layer and the first and second adhesive layers may define respective openings that are aligned (and/or in fluid communication) with the filter housing hole and the breather hole to collectively form a delimited and sealed airflow inlet to the disk drive.

The leveling layer may include foam. The foam may be or include closed cell foam. The thickness of the leveling layer may be dependent upon the degree of roughness of the disk drive housing and of the breather filter housing portion. The disk drive housing may have a first roughness that defines a first maximum difference in elevation from a first reference plane and the filter housing portion may have a second roughness that defines a second maximum difference in elevation from a second reference plane. The thickness of the leveling layer may be at least equal to the sum of the first maximum difference in elevation and the second maximum difference in elevation. The material of the leveling layer may be configured to prevent water absorption and vapor transmission into the disk drive housing.

The present invention, according to another embodiment thereof, is a disk drive that includes a disk drive housing. The disk drive housing may have a housing surface that defines a first surface roughness. A disk drive component may be configured for attachment to the disk drive housing, and may include a component surface that defines a second surface roughness. The disk drive may also include a leveling layer defining a first leveling layer surface and a second leveling layer surface. The leveling layer may be formed of a material that is impermeable to air. A first adhesive layer may be configured to adhere the component surface to the first leveling layer surface, and a second adhesive layer may be configured to adhere the second leveling layer surface to the disk drive housing. The leveling layer may have a thickness that is sufficient to enable the leveling layer in combination with the first and second adhesive layers to adhere the disk drive component to the disk drive housing in an airtight manner that compensates for the first surface roughness and for the second surface roughness.

The leveling layer may include foam, such as a closed cell foam, for example. The material of the leveling layer may be configured to prevent water absorption and vapor transmission into the disk drive housing.

BRIEF DESCRIPTION OF THE DRAWINGS

FIG. 2 is a top view of a breather filter with which embodiments of the present invention may be practiced.

FIG. 3 is a cross-sectional view of the breather filter of FIG. 2 as seen along axis 3—3;

FIG. 4 is a bottom view of the breather filter of FIG. 2;

FIG. 5 is an exploded perspective view of the breather filter of FIGS. 2–4.

DESCRIPTION OF THE PREFERRED EMBODIMENTS

Figure 1:
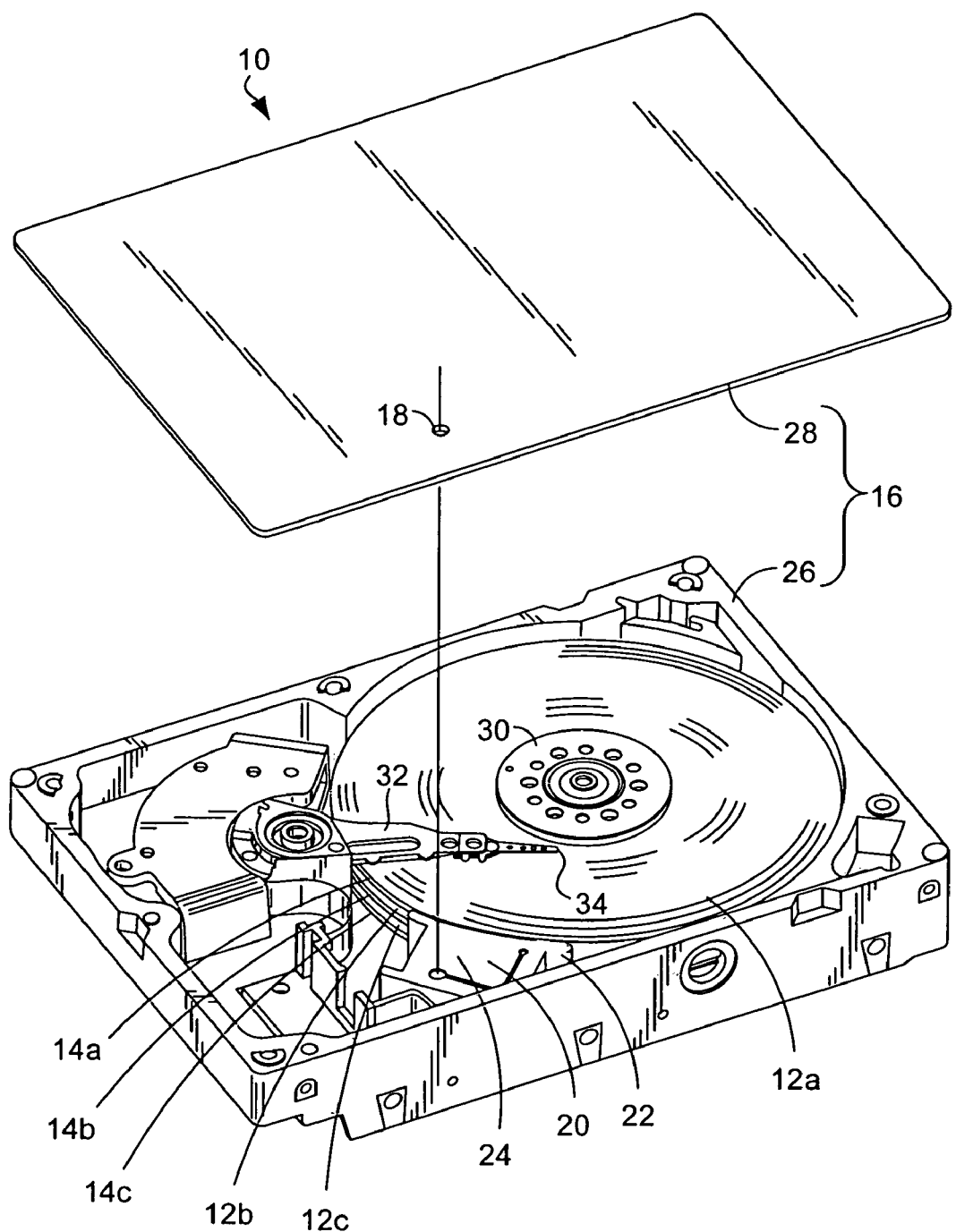
FIG. 1 is a perspective view of a disk drive including a breather filter as constructed in accordance with an aspect of the present invention.

Referring now to the drawings wherein the showings are for purposes of illustrating preferred embodiments of the present invention only, and not for purposes of limiting the same, FIGS. 1–5 and FIGS. 6A and 6B illustrate a disk drive and a breather shroud suitable for use with embodiments of the present invention.

FIG. 1 shows a disk drive 10 constructed in accordance with an embodiment of the present invention. The disk drive 10 includes at least one rotatable disk 12 (individually denoted 12a–c). The disks 12a–c respectively include disk edges 14a–c. The disk drive 10 further includes a disk drive housing 16 having a breather hole 18 formed through the disk drive housing 16. The disk drive 10 further includes a breather shroud 20 in mechanical communication with the disk drive housing 16. The breather shroud 20 includes a shroud portion 22 positioned adjacent the disk edges 14a–c. The shroud portion 22 is formed to extend along the disk edges 14a–c for mitigating airflow adjacent the disks 12a–c. The breather shroud 20 further includes a breather filter housing portion 24 integrated with the shroud portion 22. The breather filter housing portion 24 is disposed adjacent the breather hole 18 for filtering airflow through the breather hole 18. The breather filter housing portion 24 is positioned with the shroud portion 22 between the breather filter housing portion 24 and the disk edges 14a–c and mitigates airflow from the breather hole 18 to adjacent to the disks 12a–c.

In further detail, the disk drive housing 16 includes a disk drive base 26 and a disk drive cover 28 that cooperatively house the remainder of the components of the disk drive 10. As shown in FIG. 1, the breather hole 18 may be defined through the disk drive cover 28. The disk drive 10 includes a spindle motor hub (not shown) rotatably attached to the disk drive base 26. The disks 12a–c are stack mounted upon the hub, and a disk clamp 30 is used to secure the disks 12a–c to the hub. The disk drive 10 further includes a head stack assembly 32 rotatably attached to the disk drive base 26 in operable communication with the disks 12a–c. The head stack assembly 32 includes transducer heads 34 (only one shown). The head stack assembly 32 is configured to rotate relative to the disk 12a–c for reading and writing data therewith.

Referring now to FIGS. 2–4, the breather filter housing portion 24 may include an elongate passageway 36 having a passageway inlet 38 extending to a passageway outlet 40. The passageway inlet 38 is disposed in fluid communication with the breather hole 18. The passageway 36 may be configured as a diffusion path, for regulating humidity and temperature within the disk drive 10, as well as a labyrinth path for removing particulates from airflow through the breather hole 18. The breather filter housing portion 24 includes a channel 42 formed in the breather filter housing portion 24. The passageway 36 is formed between the channel 42 and the disk drive housing 16, preferably the disk drive cover 28 of the disk drive housing 16. The breather filter housing portion 24 includes an inner cavity 44, and the passageway outlet 40 extends to the inner cavity 44.

Referring now to FIG. 5, the breather filter housing portion 24 may further include a particulate filter 46 extending across the inner cavity 44 for filtering particulates from airflow through the breather hole 18. An adhesive gasket 48 may be provided for attaching the particulate filter 46 to the breather filter housing portion 24. The breather filter housing portion 24 may also include a chemical compound filter 50 disposed within the inner cavity 44 for removing chemical compounds from airflow through the breather hole 18. The chemical compound filter 50 may be a chemical trap, such as potassium carbonate or sacrificial metals, such as copper or silver. Further, the chemical compound filter 50 may be an adsorbent. The adsorbent may be a desiccant such as silica gel, clay or carbon. Further, usage of carbon is contemplated to advantageously remove organics.

Figure 6:
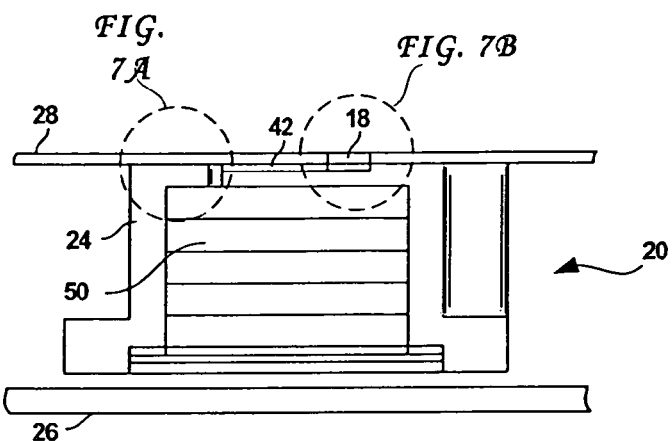
FIG. 6 shows the manner in which the breather filter may be attached to the disk drive housing, according to an embodiment of the present invention.
Figure 7A:
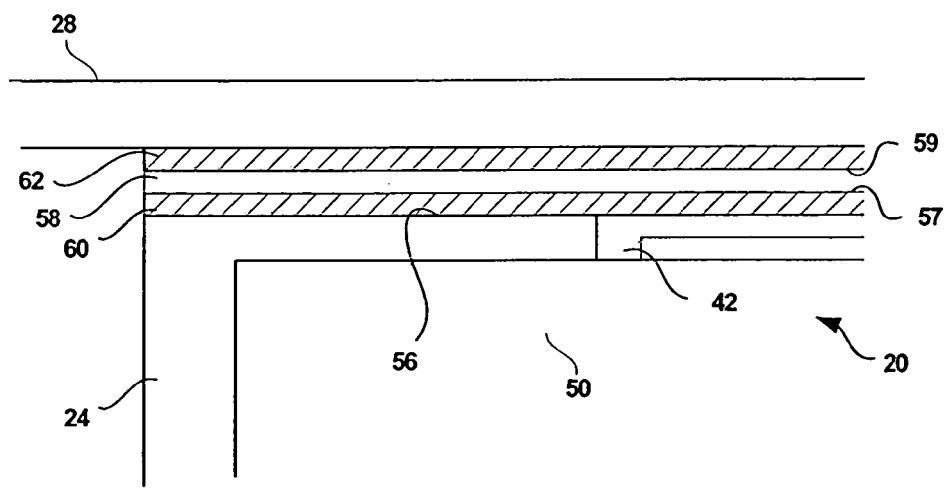
FIG. 7A is a first detail view of a portion of FIG. 6, illustrating the manner in which the leveling layer and the first and second adhesive layers adhere the breather filter to the disk drive housing, according to an embodiment of the present invention.
Figure 7B:
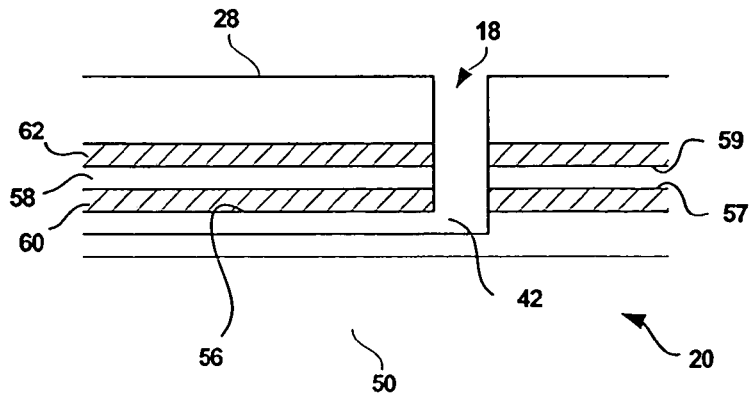
FIG. 7B is a second detail view of a portion of FIG. 6, illustrating the manner in which the leveling layer and the first and second adhesive layers adhere the breather filter to the disk drive housing, according to an embodiment of the present invention.

FIG. 6 shows the manner in which the breather filter may be attached to the disk drive housing, according to an embodiment of the present invention. FIGS. 7A and 7B are detail views of a portion of FIG. 6, illustrating the manner in which the leveling layer 58 and the first and second adhesive layers 60, 62 adhere the breather filter to the disk drive housing 28, according to an embodiment of the present invention. Considering now FIGS. 6, 7A and 7B collectively, the breather filter 20 includes a breather filter housing surface 56 that defines a filter housing hole or channel 42 that is configured to align (and/or be in fluid communication) with the breather hole 18 formed in the disk drive housing 16, such as in the disk drive cover 28, for example. A leveling layer 58 is provided, which leveling layer 58 defines a first leveling layer surface 57 and a (facing) second leveling layer surface 59. According to an embodiment of the present invention, the leveling layer 58 may be formed of a material that is impermeable to air. In this manner, there is no airflow into the drive but through the breather filter. A first adhesive layer 60 is also provided, and is configured to adhere the breather filter housing surface 56 to the first leveling layer surface 57. A second adhesive layer 62 is provided, which is configured to adhere the second leveling layer surface 59 to the disk drive housing 28. To enable a filtered airflow into the breather filter, the leveling layer 58 and the first and second adhesive layers 60, 62 define respective openings (best seen in FIG. 7B) that are aligned and/or in fluid communication with the filter housing hole or channel 42 and the breather hole 18 to collectively form a delimited and sealed airflow inlet to the disk drive.

The leveling layer 58 is formed of or includes a material that is impermeable to air. According to an embodiment of the present invention, the leveling layer 58 includes foam that is impermeable to air. One such air-impermeable foam is a closed cell foam. For example, the leveling layer 58 described herein may be formed of a closed cell foam material available from Voltek, LLC of Lawrence, Mass. among other possible suppliers. For example, the leveling layer 58 may be formed of Voltek, LLC's Volara HPT020W. The closed cell foam nature of the leveling layer contributes to its impermeability to air.

The thickness of the leveling layer 58 may be selected as dependent upon the degree of roughness of the disk drive housing 28 and of the breather filter housing surface 56. For example, the disk drive housing (the cover 28, for example) may be said to have a first roughness that defines a first maximum difference in elevation from a first reference plane. Similarly, the filter housing surface 56 may be said to have a second roughness that defines a second maximum difference in elevation from a second reference plane. The leveling layer 58 may then be selected such that its thickness is at least equal to the sum of the first maximum difference in elevation and the second maximum difference in elevation. The material of the leveling layer 58 detailed above and like foam materials are sufficiently compliant and sufficiently thick so as to compensate, in combination with the first and second adhesive layers 60, 62, for the roughness of the filter housing surface 56 and for the roughness of the disk drive housing 28. When the first and second maximum differences in elevation are on the order of about 2–5 mils, the thickness of the leveling layer 58 may be selected to be on the order of about 4–10 mils, for example. Other thickness for the leveling layer 58 are possible, as those of skill in this art will recognize.

According to further embodiments of the present invention, the combination of the leveling layer 58 and the first and second adhesive layers 60, 62 may be utilized to adhere any disk drive component to the disk drive housing. By extension, embodiments of the present invention may find utility in any context wherein it is desired to adhere two rough surfaces one to another.

The following ASTM standards may be used in evaluating the properties of the leveling layer 58: E0398-03: Test Method for Water Vapor Transmission Rate of Sheet Materials Using Dynamic Relative Humidity Measurement; F0372-99R03: Test Method for Water Vapor Transmission Rate of Flexible Barrier Materials Using an Infrared Detection Technique; F1249-01: Test Method for Water Vapor Transmission Rate Through Plastic Film and Sheeting Using a Modulated Infrared Sensor, and F1770-97E01: Test Method for Evaluation of Solubility, Diffusivity, and Permeability of Flexible Barrier Materials to Water Vapor.

What is claimed is:

1. A disk drive comprising:
    a disk drive housing having a breather hole formed through the disk drive housing; and
    a breather filter configured for attachment to the disk drive housing and for limiting and filtering airflow into the disk drive housing, the breather filter including a breather filter housing portion having a breather filter housing surface defining a filter housing hole configured to align with the breather hole formed in the disk drive housing, and a filter portion fitted within the filter housing portion;
    a leveling layer defining a first leveling layer surface and a second leveling layer surface, the leveling layer being formed of a material that is impermeable to air;
    a first adhesive layer, the first adhesive layer being configured to adhere the breather filter housing surface to the first leveling layer surface;
    a second adhesive layer, the second adhesive layer being configured to adhere the second leveling layer surface to the disk drive housing, the leveling layer and the first and second adhesive layers defining respective openings that are in fluid communication with the filter housing hole and the breather hole to collectively form a delimited and sealed airflow inlet to the disk drive.

2. The disk drive of claim 1, wherein the leveling layer includes foam.

3. The disk drive of claim 2, wherein the leveling layer includes a closed cell foam.

4. The disk drive of claim 1, wherein a thickness of the leveling layer is dependent upon a degree of roughness of the disk drive housing and of the breather filter housing surface.

5. The disk drive of claim 1, wherein the disk drive housing has a first roughness that defines a first maximum difference in elevation from a first reference plane and the filter housing surface has a second roughness that defines a second maximum difference in elevation from a second reference plane and wherein a thickness of the leveling layer is at least equal to a sum of the first maximum difference in elevation and the second maximum difference in elevation.

6. The disk drive of claim 1, wherein the material of the leveling layer is configured to prevent water absorption and vapor transmission into the disk drive housing.

7. A disk drive comprising:
    a disk drive housing, the disk drive housing having a housing surface that defines a first surface roughness; and
    a disk drive component configured for attachment to the disk drive housing, the disk drive component including a component surface that defines a second surface roughness;
    a leveling layer defining a first leveling layer surface and a second leveling layer surface, the leveling layer being formed of a material that is impermeable to air;
    a first adhesive layer, the first adhesive layer being configured to adhere the component surface to the first leveling layer surface, and
    a second adhesive layer, the second adhesive layer being configured to adhere the second leveling layer surface to the disk drive housing, the leveling layer having a thickness that is sufficient to enable the leveling layer in combination with the first and second adhesive layers to adhere the disk drive component to the disk drive housing in an airtight manner that compensates for the first surface roughness and for the second surface roughness.

8. The disk drive of claim 7, wherein the leveling layer includes foam.

9. The disk drive of claim 8, wherein the leveling layer includes a closed cell foam.

10. The disk drive of claim 7, wherein the material of the leveling layer is configured to prevent water absorption and vapor transmission into the disk drive housing.

* * * * *